(12) United States Patent
Weston et al.

(10) Patent No.: US 7,856,731 B2
(45) Date of Patent: Dec. 28, 2010

US007856731B2

(54) CONTACT SENSING PROBE

(75) Inventors: Nicholas John Weston, Peebles (GB); Geoffrey McFarland, Wotten-under-Edge (GB)

(73) Assignee: Renishaw PLC, Wotton-under-Edge (GB)

( * ) Notice: Subject to any disclaimer, the term of this patent is extended or adjusted under 35 U.S.C. 154(b) by 113 days.

(21) Appl. No.: 12/227,074

(22) PCT Filed: May 8, 2007

(86) PCT No.: PCT/GB2007/001676

§ 371 (c)(1),
(2), (4) Date: Nov. 6, 2008

(87) PCT Pub. No.: WO2007/129082

PCT Pub. Date: Nov. 15, 2007

(65) Prior Publication Data

US 2009/0100693 A1  Apr. 23, 2009

(30) Foreign Application Priority Data

May 8, 2006  (GB) ................................. 0608998.1

(51) Int. Cl.
*G01B 5/012* (2006.01)

(52) U.S. Cl. .......................................... 33/561; 33/559

(58) Field of Classification Search .................. 33/556, 33/559, 561
See application file for complete search history.

(56) References Cited

U.S. PATENT DOCUMENTS

| 4,523,382 | A  |   | 6/1985  | Werner et al.           |
|-----------|----|---|---------|-------------------------|
| 4,625,417 | A  | * | 12/1986 | Cusack ............ 33/701 |
| 5,222,304 | A  | * | 6/1993  | Butler ............ 33/561 |
| 5,247,751 | A  |   | 9/1993  | Ohya et al.             |
| 5,259,122 | A  | * | 11/1993 | Ichiba et al. ....... 33/561 |
| 5,755,038 | A  | * | 5/1998  | McMurtry .......... 33/559 |
| 6,799,378 | B2 | * | 10/2004 | Schopf et al. ....... 33/556 |
| 2002/0005062 | A1 |   | 1/2002 | Matsuki et al.          |
| 2006/0070253 | A1 | * | 4/2006 | Ruijl et al. ........ 33/559 |
| 2009/0043534 | A1 | * | 2/2009 | Prestidge et al. .... 702/152 |
| 2009/0133277 | A1 | * | 5/2009 | Tanaka ............ 33/558 |

FOREIGN PATENT DOCUMENTS

| EP | 0 093 299 A1 | 11/1983 |
| EP | 0 730 210 A1 | 9/1996  |
| EP | 0 927 867 A2 | 7/1999  |
| GB | 2 006 435 A  | 5/1979  |
| GB | 2 070 249 A  | 9/1981  |
| GB | 2 367 361 B  | 9/2002  |

* cited by examiner

*Primary Examiner*—G. Bradley Bennett
(74) *Attorney, Agent, or Firm*—Oliff & Berridge, PLC

(57) ABSTRACT

A contact sensing probe having a stylus which is vibrated longitudinally by a piezoelectric transducer. Contact with a workpiece is detected from damping of the vibration. The stylus is mounted to a probe body via parallel diaphragm springs. These cooperate with a counter mass to form a mechanical low pass filter, which isolates the stylus vibrations from influences caused by the mounting or handling of the probe body.

22 Claims, 3 Drawing Sheets

Figure 1:
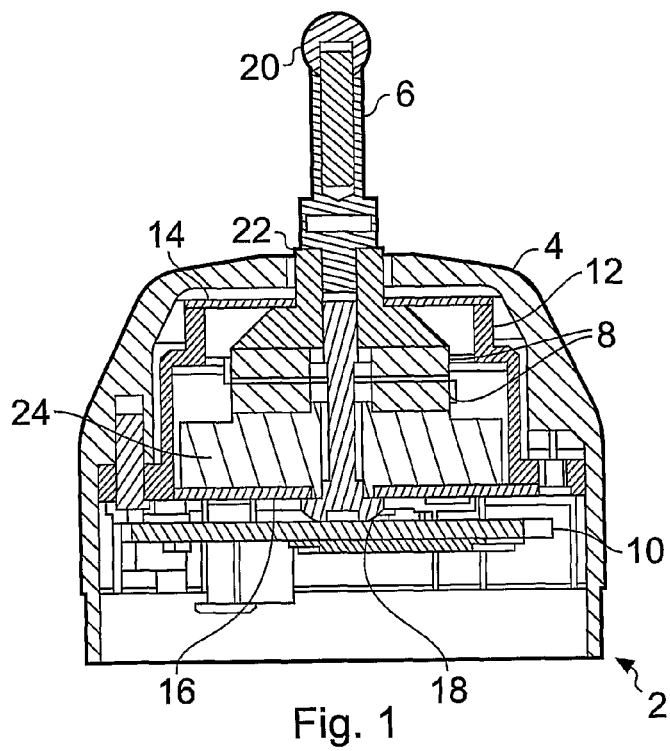

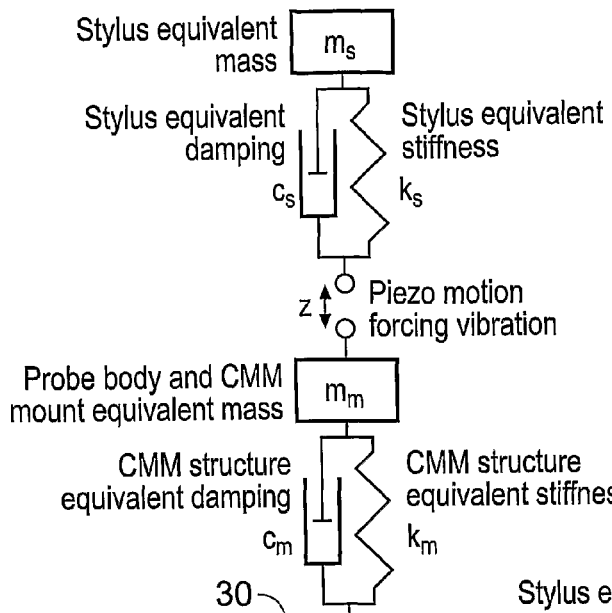
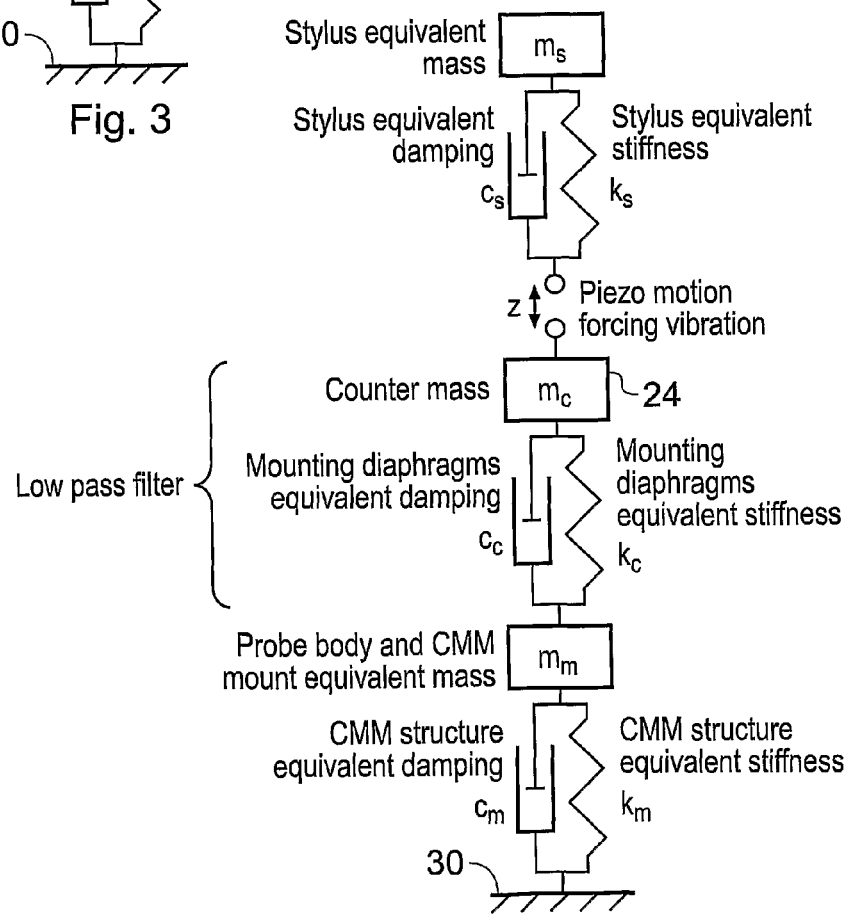
Fig. 3
Fig. 4

CONTACT SENSING PROBE

The present invention relates to a contact sensing or "touch" probe having a stylus that is vibrated during use. In particular, the invention relates to such a probe for use on co-ordinate positioning machines, such as portable articulated measuring arms, co-ordinate measuring machines (CMM), machine tools, and the like.

Contact sensing probes are known. GB2006435 describes a touch probe having a contact element (e.g. a stylus) and a piezoelectric transducer for vibrating the stylus. The stylus of such a probe has one or more natural vibration frequencies corresponding to one or more different modes of vibration. Mechanical resonance will thus occur whenever the transducer is driven at certain frequencies or modes of vibration. A sensing circuit is also provided which detects engagement of the contact element with an object by sensing a parameter change in the electrical signal that is applied to or generated by the piezoelectric transducer.

U.S. Pat. No. 5,247,751 describes a further touch probe device. The device of U.S. Pat. No. 5,247,551 also comprises a transducer to which an RF signal is applied to induce ultrasonic vibration of an attached stylus at its resonant frequency. The electrical signal supplied to the piezoelectric transducer is monitored for a change that indicates the stylus has made contact with an object.

However, research by the present inventors has shown that the resonance of the stylus can be affected by factors such as the manner in which the stylus is mounted in the probe, or in which the probe is mounted in the CMM or other coordinate positioning machine. In the case of a manually-operated CMM, it can even be affected by the way the operator holds the system. This can significantly modify the vibrations of the stylus, leading to the possibility of false sensing of contact between the stylus and the object.

According to the present invention, a contact sensing probe comprises a probe body, an object-contacting stylus mounted in the probe body, a transducer mechanically coupled to the stylus to vibrate the stylus, and means for mechanically isolating the stylus from vibrations induced via the probe body.

Preferably the means for isolating the stylus forms a mechanical low-pass filter. It may be mounted between the probe body and the transducer or stylus. It may comprise one or more (preferably two) flexible diaphragms, in conjunction with a mass. The flexibilities of the diaphragms and the size of the mass may then be arranged to provide the isolation.

Preferably the transducer comprises one or more piezo elements. Preferably the transducer vibrates the stylus longitudinally (i.e. compression waves along the axis of the stylus).

A co-ordinate positioning machine may incorporate a contact sensing probe according to the present invention. The co-ordinate position machine may be a manual measuring machine (e.g. an articulating arm of the type described in EP0730210), a motorised CMM or a machine tool.

Figure 2:
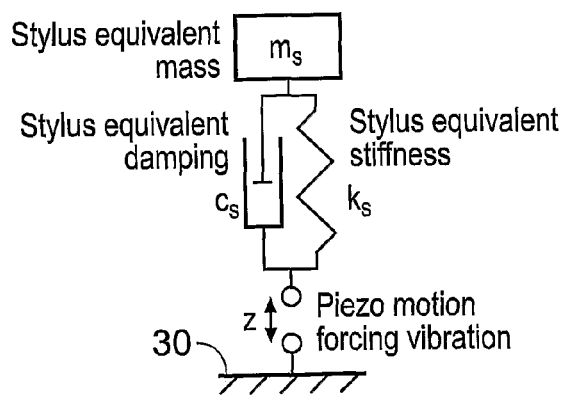
Figure 5:
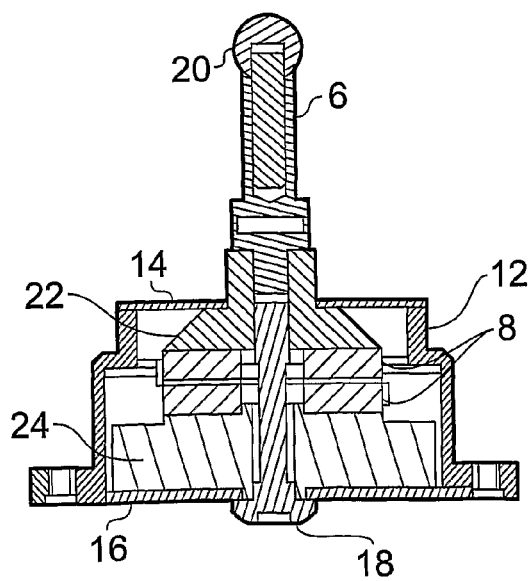
Figure 6:
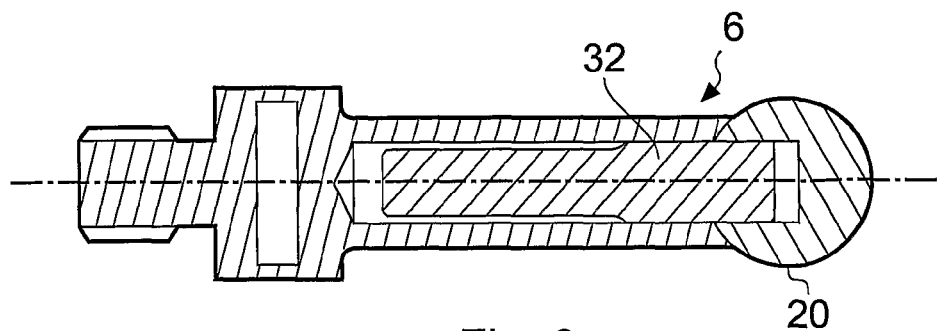
Figure 7:
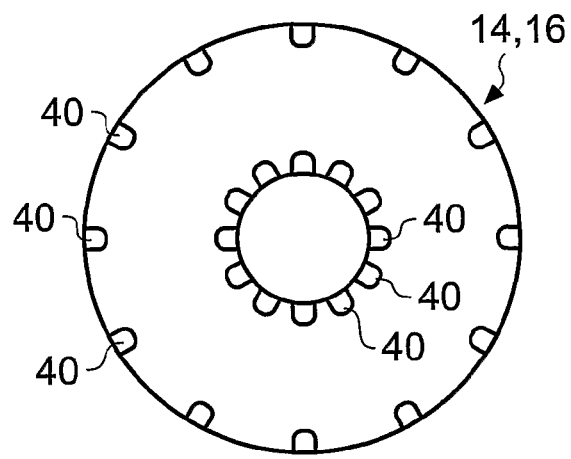
Figure 8:
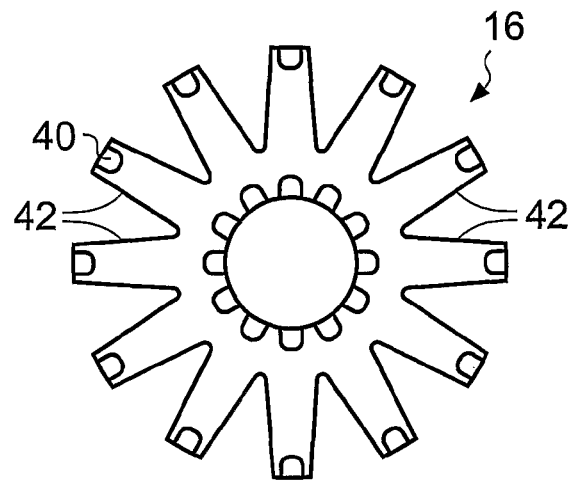

Embodiments of the invention will now be described, by way of example only, with reference to the accompanying drawings in which:

FIG. 1 shows a cross-section of a probe according to the present invention,

FIG. 2 is an idealised schematic diagram representing the mechanical system of the probe, FIGS. 3 and 4 are similar idealised schematic diagrams representing the mechanical system of the probe in combination with a CMM on which it is mounted, FIG. 5 shows a detail of the cross-section of FIG. 1, FIG. 6 is a cross section of a stylus which may optionally be used with the probe, and FIGS. 7 and 8 are plan views of diaphragm springs which may be used in the probe.

Referring to FIGS. 1 and 5, a probe 2 of the present invention is illustrated.

The probe 2 comprises a probe body 4 suitable for mounting on a co-ordinate positioning machine. In this example, the probe 2 is a manual scanning probe suited for mounting on a portable articulated measuring arm. The probe 2 comprises a releasably attachable stylus 6 and a transducer in the form of a piezo-electric stack 8 that is driven by drive circuitry 10. This arrangement allows the stylus 6 to be vibrated longitudinally at a required frequency.

The piezo-electric stack 8 also acts as a sensor to detect contact of a tip 20 of the stylus with an object to be measured. When contact occurs, it causes changes in the vibration which are detected by monitoring the electrical signals of the piezo-electric stack.

The piezo-electric stack 8, the associated drive circuitry 10, the sensing and other aspects of the probe are described in more detail in our co-pending international PCT patent applications filed simultaneously herewith under our references 0685/WO and 0686/WO (corresponding to and claiming priority from UK patent applications nos. 0609022.9 and 0608999.9 respectively). The contents of those applications are incorporated herein by reference.

A casing 12 having a front flexible diaphragm spring 14 and a rear flexible diaphragm spring 16 are provided within the probe body 4. The casing 12 and the probe body 4 are arranged to be mechanically isolated from the piezo-electric stack 8 via the diaphragms 14,16. The piezo-electric stack 8 is sandwiched between a stylus holder 22 and a counter mass 24 by a bolt 18 passing through an aperture in the rear diaphragm 16. The stylus holder 22 passes through an aperture formed in the front diaphragm 14, and the stylus 6 is releasably screwed into it. The stylus 6, piezo-electric stack 8, stylus holder 22, mass 24 and bolt 18 thus form an assembly. The diaphragms 14,16 connect the stylus 6 (either directly, or indirectly via this assembly) to the casing 12 and probe body 14. In the appended claims, the term "connected" refers to either direct or indirect connection.

In this manner, the vibrating part of the apparatus can be mechanically isolated from the stationary probe body. The rapid expansion and contraction of the piezo-electric stack 8 can thus be converted into longitudinal vibration in the form of compression waves in the stylus, with minimal associated probe body vibration.

The mechanical isolation will now be described in more detail.

Referring to FIG. 2, consider the probe/stylus system as a simplified mass and spring. The mass $m_s$ represents the equivalent mass of the stylus tip, the spring $k_s$ represents the equivalent axial stiffness of the stylus, and the damper $c_s$ represents the equivalent damping present in the stylus part of the system. In the ideal case the body of the probe would be grounded as represented at 30.

Unfortunately the piezos are not rigidly mounted to ground, and even in the simplest system would have to be mounted off the probe body, which would itself not be rigidly mounted to ground. The probe body itself would be mounted on the CMM, which, not being rigid, is also represented as a mass and spring damper system, as shown in FIG. 3. Here, $m_m$ indicates the equivalent mass of the probe body and CMM mount; $c_m$ represents the equivalent damping of the CMM structure; and $k_m$ represents the equivalent stiffness of the CMM structure.

Note that $c_m$ and $k_m$ are dependent upon the installation of the probe. In the case of a manual CMM they are also dependent upon the way the operator holds the system. It is possible, therefore, for the $m_m$, $c_m$, $k_m$ system to have a natural frequency similar to that at which the stylus is being vibrated. In such a situation the vibrations in the stylus will be significantly modified, leading to the possibility of false triggers due to the way the probe is attached or handled.

That problem can be avoided by inserting what is essentially a mechanical low pass filter to provide mechanical isolation between the piezo motion elements and the probe body. This can have a fixed frequency significantly lower than that at which the stylus is vibrated. With this filter in place the probe can even be mounted in such a way that the whole structure has the same natural frequency as the stylus vibration (although this is unlikely), and very little energy can pass through the filter in either direction. Vibrations in the stylus can therefore have little effect on the probe body, and vice versa, removing the possibility of false triggers due to mounting or handling.

Such an arrangement is shown schematically in FIG. 4. The diaphragm springs form compliant members. The low pass filter comprises the counter mass 24, denoted $m_c$; the equivalent damping $c_c$ of the mounting diaphragms 14,16; and the equivalent stiffness $k_c$ of the mounting diaphragms 14,16.

Thus, the mass of the counter mass 24 and the flexibilities of the diaphragms 14,16 are chosen to form a low pass filter and achieve the mechanical isolation.

Note that the diaphragms 14,16 are most flexible (compliant) along the axis of the stylus. This is the vibration mode the system works at and therefore the most important mode which must be isolated from the body. It also means that the probe is almost rigid transverse to this axis, which is a benefit as this means the probe does not bend significantly in this plane. This is most important in a manual CMM, as this is the direction in which the operator can apply the greatest moment (and therefore bending force) to the probe. Choosing the vibration mode to be along the axis of the probe therefore means the probe can be isolated from the body, and yet rigid when the operator puts large sideways forces on the stylus. In the direction of the stylus vibration, the diameter and thickness of the diaphragms are selected so that, when considered with the size of the counter mass 24, the natural frequency of this system is some way below the minimum frequency a stylus might be vibrated at. This makes the diaphragms an effective low pass filter for the axial vibrations in the longitudinal direction of the stylus.

The frequency of this low pass filter sets a lower limit on the tuning point of the natural frequency of the stylus in its axial direction. A tuning point any lower than the filter frequency would make the probe susceptible to false triggers when handled. The upper limit on the natural frequency of the stylus is set by the lowest natural frequency of the other parts within the vibrating part of the probe. For example, the counter mass 24 may have a plate-bending mode at around 60 kHz. If this were selected as the tuning point the probe would be completely insensitive, as the stylus tip would hardly move.

The upper limit on tuning frequency presents a problem with short styli, especially those with small (low mass) tips, which can have a first mode beyond this point. This can be overcome as shown in FIG. 6, by adding extra moving mass to the tip without adding to the axial stiffness. A "slug" 32 is added to the inside of a hollow stylus 6, the slug being attached only at the tip end of the stylus. This can bring the natural frequency to within the desired range.

It is possible to use complete discs for both the flexible diaphragms 14, 16, as shown in FIG. 7. Here, reference numerals 40 denote features for mounting the diaphragm to the casing 12 and piezo-electric stack 8. With such complete discs, it is desirable that the separation between the mounting points on the casing 12 for the respective diaphragms is the same as the separation between the corresponding diaphragm mounting points on the piezo-electric stack 8. If there is any significant difference in these distances then one or both of the diaphragms will have to become dish shaped during the assembly process. With complete disks this dishing process is very hard to control and can cause significant variation in the vibration characteristics of the assembly. Unfavourable vibration characteristics can cause "split modes" where there are two resonances very near the vibration mode of interest, reducing probe sensitivity. It may even cause the tuning algorithm described in our above-mentioned co-pending international PCT applications to fail.

To overcome this problem one of the diaphragms can be made in such a way as the dishing process is more controlled. As shown in FIG. 8, this diaphragm has a spoked shape, with radially extending fingers 42 on the disc. Circumferential strains caused by dishing can thus be removed. Only one of the diaphragms needs to be made to this kind of spoked pattern.

When a spoked diaphragm is used this takes up any differences in the distance between the casing mounting points and the distance between the piezo-electric stack mounting points. These differences are generally caused by a build up of manufacturing tolerances, particularly with respect to the piezo-electric elements themselves.

By its nature the spoked diaphragm tends to be more flexible than the solid disc diaphragm—particularly out of the plane of the disc. For this reason it is preferred that this is used as the flexible diaphragm 16 at the counter mass end of the piezo-electric stack, rather than as the diaphragm 14 at the stylus end. The stylus end of the stack is nearest to a point of zero movement under the vibration mode of interest, and so the effect of the stiffer diaphragm on the mode of vibration will be less at this point. Thus, the effect of any manufacturing tolerances in the stiffer diaphragm and its mounting on the vibration mode will be significantly smaller. This in turn means that the stack and casing assembly can be more reliably manufactured.

Although the above examples describe use of a probe for a manual positioning arm, it should be noted that such a probe could be used on any type of measuring machine. For example, a probe of the type described herein could be used on any manual measuring machine, motorised CMM or machine tool. In fact, such a probe could be advantageously used whenever low force contacting sensing is required. If motorised systems are used, the probe may further comprise an over-travel mechanism (e.g. a passive kinematic mount) which repeatably returns to a given location and orientation to prevent damage during contact sensing.

One method of use of the probe on such a machine is as a touch trigger probe. When the stylus contacts a workpiece surface, the vibration is damped, and a trigger signal is issued by the sensing circuitry.

An alternative method of use will now be described. A workpiece surface is scanned, using a contact sensing probe as described above, mounted in a coordinate positioning machine of any of the types mentioned. The workpiece surface is contacted by the stylus tip in a direction transverse to the longitudinal axis of the stylus. Then the workpiece surface is scanned with the stylus while maintaining contact between the surface and the stylus in the transverse direction. The sensing circuitry detects from the damping of the vibration of the stylus that contact continues to be maintained during the scanning. The coordinate positioning machine causes a series of successive coordinate readings of the workpiece surface to be taken while the contact continues to be maintained as thus determined.

This method makes use of the fact that the mounting of the stylus is rigid and stiff in the transverse direction. Thus there is little deformation of the probe and stylus combination as a result of the transverse contact forces with the workpiece surface. As a result, accurate measurements can be assured.

The mounting of the stylus via the diaphragms is stiff in two orthogonal directions transverse to the longitudinal axis, and so the probe is useful for scanning three-dimensional workpieces having complex shapes.

The invention claimed is:

1. A contact sensing probe comprising:
   a probe body,
   an object-contacting stylus mounted in the probe body,
   a transducer mechanically coupled to the stylus to vibrate the stylus, and
   a mass and at least one compliant member connected in series between the probe body and the stylus, the mass being connected between the stylus and the at least one compliant member,
   wherein the mass and the at least one compliant member are configured to mechanically isolate the stylus vibrations from the probe body.

2. A contact sensing probe according to claim 1, wherein the transducer is mounted between the mass and the stylus.

3. A contact sensing probe according to claim 1, wherein the at least one compliant member comprises a spring.

4. A contact sensing probe according to claim 1, wherein the at least one compliant member comprises a flexible diaphragm.

5. A contact sensing probe according to claim 4, wherein two flexible diaphragms are connected between the stylus and the probe body.

6. A contact sensing probe according to claim 1, wherein an object-contacting tip of the stylus has an extra mass attached thereto.

7. A contact sensing probe according to claim 1, wherein the transducer comprises one or more piezo elements.

8. A contact sensing probe according to claim 1, wherein the transducer vibrates the stylus longitudinally.

9. A contact sensing probe according to claim 8, wherein the at least one compliant member is stiff in a direction transverse to a longitudinal direction of the stylus.

10. A co-ordinate positioning machine incorporating a contact sensing probe according to claim 1.

11. A method of scanning a workpiece surface, using a contact sensing probe mounted in a coordinate positioning machine,
    the probe comprising a probe body; an object-contacting stylus, the stylus having a longitudinal axis; a mounting for the stylus in the probe body; a transducer mechanically coupled to the stylus to vibrate the stylus in the longitudinal direction; wherein the mounting is stiff in a direction transverse to the longitudinal axis;
    the method comprising:
    contacting the workpiece surface with the stylus in the transverse direction;
    scanning the workpiece surface while maintaining contact between the workpiece surface and the stylus in the transverse direction;
    detecting from the vibration of the stylus that contact continues to be maintained during the scanning; and
    causing the coordinate positioning machine to take a series of successive coordinate readings of the workpiece surface while the contact continues to be maintained as determined in the detecting.

12. A method according to claim 11, wherein the mounting is stiff in two orthogonal said directions transverse to the longitudinal axis.

13. A contact sensing probe comprising
    a probe body,
    an object-contacting stylus mounted in the probe body,
    a transducer mechanically coupled to the stylus to vibrate the stylus, and
    a mechanical low-pass filter that mechanically isolates the stylus vibrations from the probe body,
    wherein the mechanical low-pass filter comprises a mass and at least one compliant member connected in series between the probe body and the stylus, the mass being connected between the stylus and the at least one compliant member.

14. A contact sensing probe according to claim 13, wherein the transducer is mounted between the mass and the stylus.

15. A contact sensing probe according to claim 13, wherein the at least one compliant member comprises a spring.

16. A contact sensing probe according to claim 13, wherein the at least one compliant member comprises a flexible diaphragm.

17. A contact sensing probe according to claim 16, wherein two flexible diaphragms are connected between the stylus and the probe body.

18. A contact sensing probe according to claim 13, wherein an object-contacting tip of the stylus has an extra mass attached thereto.

19. A contact sensing probe according to claim 13, wherein the transducer comprises one or more piezo elements.

20. A contact sensing probe according to claim 13, wherein the transducer vibrates the stylus longitudinally.

21. A contact sensing probe according to claim 20, wherein the at least one compliant member is stiff in a direction transverse to a longitudinal direction of the stylus.

22. A co-ordinate positioning machine incorporating a contact sensing probe according to claim 13.

* * * * *